(12) United States Patent
Cho et al.

(10) Patent No.: US 8,210,700 B2
(45) Date of Patent: Jul. 3, 2012

(54) BACKLIGHT MODULE

(75) Inventors: Chin-Hsing Cho, Yunlin County (TW); Tsao-Yuan Fu, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 415 days.

(21) Appl. No.: 12/542,694

(22) Filed: Aug. 18, 2009

(65) Prior Publication Data
US 2010/0226146 A1  Sep. 9, 2010

(30) Foreign Application Priority Data
Mar. 6, 2009  (TW) .............................. 98203480 U

(51) Int. Cl.
*F21V 8/00* (2006.01)
*F21V 7/04* (2006.01)

(52) U.S. Cl. ....... 362/97.1; 362/623; 362/628; 362/615; 362/225

(58) Field of Classification Search .................. 362/612, 362/623, 628, 615, 616, 97.1–97.4, 330, 362/224, 225, 609
See application file for complete search history.

(56) References Cited

U.S. PATENT DOCUMENTS

| | | | | |
|---|---|---|---|---|
| 4,714,983 | A * | 12/1987 | Lang | 362/27 |
| 5,404,277 | A * | 4/1995 | Lindblad | 362/631 |
| 5,779,339 | A * | 7/1998 | Konishi et al. | 362/606 |
| 5,808,708 | A * | 9/1998 | Oyama et al. | 349/65 |
| 6,412,969 | B1 * | 7/2002 | Torihara et al. | 362/609 |
| 6,561,663 | B2 * | 5/2003 | Adachi et al. | 362/616 |
| 6,877,873 | B2 * | 4/2005 | Mai et al. | 362/613 |
| 7,614,775 | B2 * | 11/2009 | Iwasaki | 362/616 |
| 7,740,389 | B2 * | 6/2010 | Chen et al. | 362/609 |
| 7,868,970 | B2 * | 1/2011 | Iwasaki | 349/64 |
| 2004/0151007 | A1 * | 8/2004 | Chuang | 362/561 |
| 2006/0146574 | A1 * | 7/2006 | Fu et al. | 362/621 |

* cited by examiner

Primary Examiner — Bao Q Truong
(74) Attorney, Agent, or Firm — Jianq Chyun IP Office

(57) ABSTRACT

A backlight module including a housing, a first reflector plate, a light guide plate, a second reflector plate and at least one light bar is provided. The first reflector plate is disposed on a bottom of the housing, and the light guide plate is disposed within the housing. The light guide plate includes a first optical surface, a second optical surface and a light emitting surface, and the first optical surface is adjacent to the first reflector plate. The second reflector plate is adjacent to the second optical surface of the light guide plate. The light bar is disposed between the first reflector plate and the light guide plate, and the light bar is opposite to the second optical surface.

9 Claims, 2 Drawing Sheets

BACKLIGHT MODULE

CROSS-REFERENCE TO RELATED APPLICATION

This application claims the priority benefit of Taiwan application serial no. 98203480, filed Mar. 6, 2009. The entirety of the above-mentioned patent application is hereby incorporated by reference herein and made a part of specification.

BACKGROUND OF THE INVENTION

1. Field of the Invention

The present invention generally relates to a backlight module, in particular, to a direct-type backlight module having an edge-type light emitting structure.

2. Description of Related Art

As a liquid crystal display (LCD) panel does not emit lights itself, a backlight module is required to provide a sufficient intensity and evenly distributed light source to display an image. A structure of a conventional backlight module mainly includes two types, namely, an edge-type backlight module and a direct-type backlight module.

In the edge-type backlight module, a light source is placed at certain edges around the light guide plate, and then the lights are guided, so as to provide uniform light emission, which is edge-type light emission. As the space at the edges is somewhat limited, the numbers of cold cathode fluorescent lamps (CCFLs) or light emitting diode (LED) light bars capable of being arranged therein to provide a light source is restricted. Thus, if the edge-type backlight module is used in a large-scale display, a phenomenon of insufficient luminance occurs, which fails to satisfy the demand of a high brightness. In the direct-type backlight module, a light source is disposed below a LCD panel directly, which is upward-type light emission. Although this type of backlight module provides sufficient backlight brightness, the evenness of the light provided thereby is poor. Therefore, a large light source diffusion space is further needed and the structure of the backlight module is rather thick, such that the thin-type design thereof cannot be realized.

SUMMARY OF THE INVENTION

Accordingly, the present invention is directed to a direct-type backlight module having an edge-type light emitting structure, which not only has an advantage of a high luminance of a direct-type backlight module, but also has thin-type and power-saving advantages of an edge-type backlight module.

As embodied and broadly described herein, the present invention provides a backlight module. The backlight module includes a housing, a first reflector plate, a light guide plate, a second reflector plate, and at least one light bar. The first reflector plate is disposed on a bottom of the housing, and the light guide plate is disposed within the housing. The light guide plate has a first optical surface, a second optical surface, and a light emitting surface, and the first optical surface is adjacent to the first reflector plate. The second reflector plate is adjacent to the second optical surface of the light guide plate. The light bar is disposed between the first reflector plate and the light guide plate, and the light bar is opposite to the second optical surface.

The backlight module further includes at least one optical film. The optical film is disposed adjacent to the light emitting surface of the light guide plate. In the backlight module, the optical film includes a diffusion film and a brightness enhancement film.

In the backlight module, the first optical surface includes a pattern.

In the backlight module, the second optical surface includes a plurality of slot structures. A cross section of the slot structures is V-shaped, ellipse-shaped or trapezium-shaped.

In the backlight module, a notch is respectively formed at two sides of the first reflector plate, so as to accommodate the light bar. The light bar is an LED light bar or a CCFL.

To make the above and other objectives, features, and advantages of the present invention more comprehensible, embodiments are illustrated in detail in the following with reference to the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
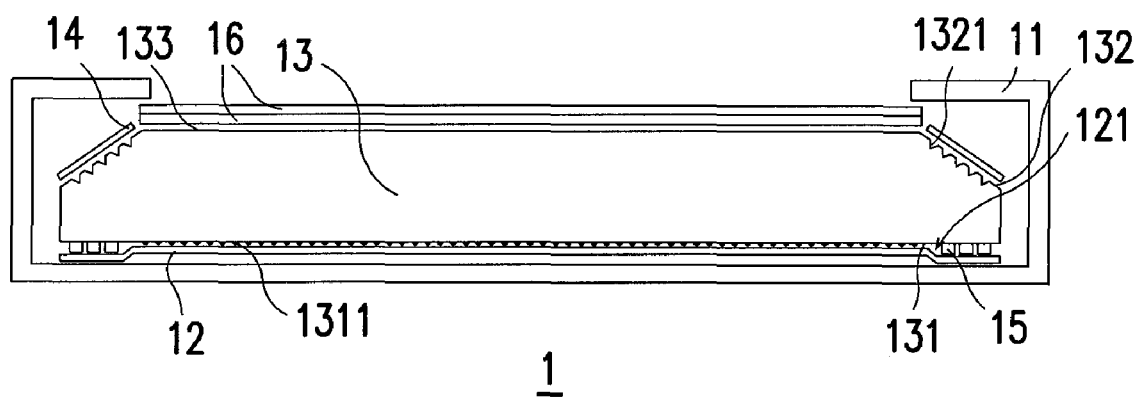
FIG. 1 is a side view of a backlight module according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a side view of a backlight module according to an embodiment of the present invention. Referring to FIG. 1, a backlight module 1 mainly includes a housing 11, a first reflector plate 12, a light guide plate 13, a second reflector plate 14, at least one light bar 15, and at least one optical film 16.

The first reflector plate 12 is disposed on a bottom of the housing 11. The light guide plate 13 is disposed within the housing 11. Preferably, the housing 11 is a backplate. The light guide plate 13 is moulded through a plastic injection molding process, so that the light guide plate 13 can be easily manufactured. The light guide plate 13 mainly serves as a medium for guiding lights. The light guide plate 13 has a first optical surface 131, a second optical surface 132, and a light emitting surface 133. The first optical surface 131 of the light guide plate 13 is adjacent to the first reflector plate 12. The second reflector plate 14 is adjacent to the second optical surface 132 of the light guide plate 13.

One of the differences between the light guide plate 13 of the present invention and a conventional light guide plate is that a cutting angle is respectively formed at two sides of the light guide plate 13, such that an angle of less than 90° is included between the first optical surface 131 and the second optical surface 132.

The light bar 15 is used to provide a light source required by the whole backlight module 1, which may be an LED light bar or a CCFL. If the light bar 15 is an LED light bar, the number of the LEDs may be determined depending upon the actual requirements. Moreover, the LEDs may be RGB LEDs or white-light LEDs.

Figure 2:
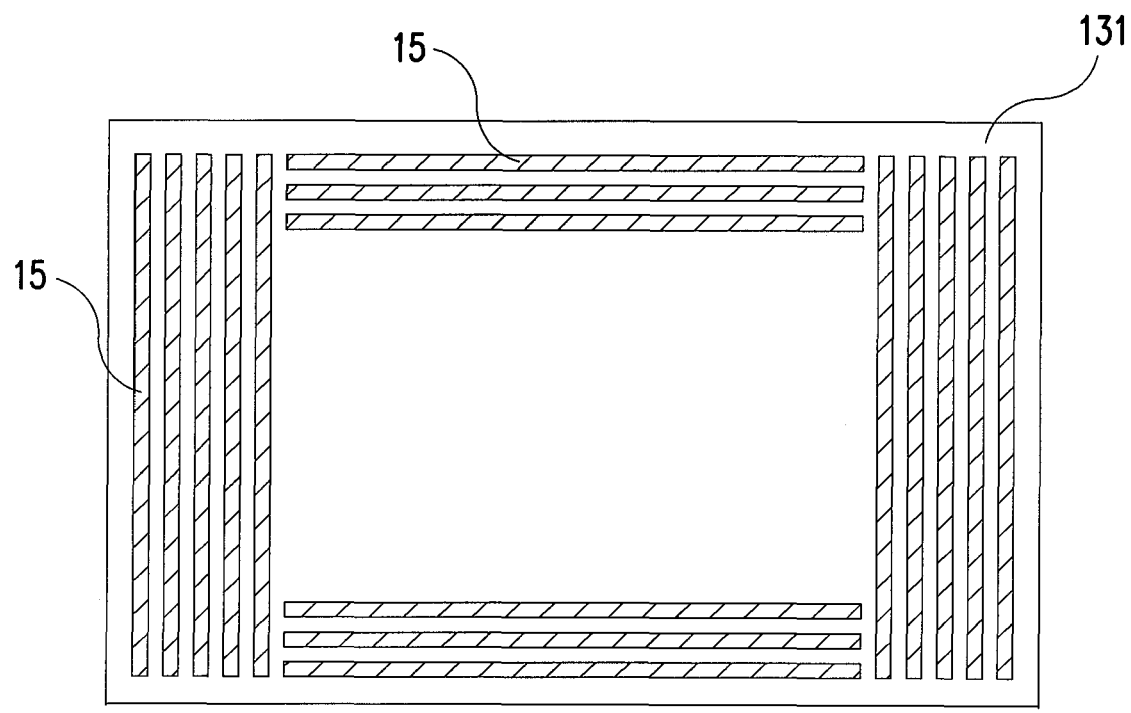
FIG. 2 is a schematic view of a relative position between a light bar and a first optical surface of a light guide plate according to an embodiment of the present invention.

FIG. 2 is a schematic view of a relative position between a light bar and a first optical surface of a light guide plate according to an embodiment of the present invention. Referring to both FIGS. 1 and 2, at least one light bar 15 is disposed between the first reflector plate 12 and the light guide plate 13. Moreover, the light bars 15 are opposite to the second optical surface 132. At positions adjacent to the first optical surface 131 of the light guide plate 13, a notch 121 is respectively formed at two sides of the first reflector plate 12 to accommodate the light bars 15 respectively. The light bars 15 may be disposed around an upper side of the first optical surface 131 of the light guide plate 13 at the same time, as shown in FIG. 2. Alternatively, the light bars 15 may also be partially disposed around the first optical surface 131 according to the actual demands.

Referring to FIG. 1, the optical film 16 is disposed adjacent to the light emitting surface 133 of the light guide plate 13. The optical film 16 includes a diffusion film and a brightness enhancement film. The first optical surface 131 of the light guide plate 13 has a pattern 1311. The second optical surface 132 has a plurality of slot structures 1321. A cross section of the slot structures 1321 may be V-shaped, ellipse-shaped or trapezium-shaped.

Lights emitted from the light bars 15 are mixed through the slot structures 1321 of the second optical surface 132 of the light guide plate 13. Particularly, when the light bars 15 are LED light bars and the adopted LEDs are RGB LEDs, the slot structures 1321 may achieve an especially desirable light mixing function.

The pattern 1311 of the first optical surface 131 of the light guide plate 13 is used to modulate a density of lights emitted from the light bars 15, and enables lights entering the light guide plate 13 to be effectively utilized, so as to reduce the loss of light energy, and enhance the light utilization efficiency. Therefore, the light guide plate 13 has preferred light emitting luminance and light emitting evenness.

The first reflector plate 12 and the second reflector plate 14 respectively assist the pattern 1311 on the first optical surface 131 and the slot structures 1321 on the second optical surface 132 to reflect light rays, so as to prevent the light leakage, and provide the light source reusing function.

In view of the above, in the backlight module according to the present invention, by realizing the evenness of a light source on a light emitting surface through reflection and refraction, the backlight module not only has an advantage of a high luminance of a direct-type backlight module, but also has advantages of thin-type and power-saving of an edge-type backlight module. Moreover, the number of adopted CCFLs or LED light bars is reduced in the present invention, thereby achieving the effects of low cost and high luminance.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight module, comprising:
   a housing;
   a first reflector plate, disposed on a bottom of the housing;
   a light guide plate, disposed within the housing, and comprising a first optical surface, a second optical surface, and a light emitting surface, the second optical surface being connected to a periphery of the light emitting surface opposite to the first optical surface, wherein the first optical surface is adjacent to the first reflector plate;
   a second reflector plate, disposed adjacent to the second optical surface of the light guide plate; and
   at least one light bar, disposed between the first reflector plate and the light guide plate, wherein the light bar and the second reflector plate are located at opposite sides of the light guide.

2. The backlight module according to claim 1, further comprising at least one optical film, wherein the optical film is disposed adjacent to the light emitting surface of the light guide plate.

3. The backlight module according to claim 2, wherein the optical film comprises a diffusion film and a brightness enhancement film.

4. The backlight module according to claim 1, wherein the first optical surface has a pattern.

5. The backlight module according to claim 1, wherein the second optical surface has a plurality of slot structures.

6. The backlight module according to claim 5, wherein a cross section of the slot structures is V-shaped, ellipse-shaped or trapezium-shaped.

7. The backlight module according to claim 1, wherein a notch is respectively formed at two sides of the first reflector plate, so as to accommodate the light bar.

8. The backlight module according to claim 1, wherein the light bar is a light emitting diode (LED) light bar.

9. The backlight module according to claim 1, wherein the light bar is a cold cathode fluorescent lamp (CCFL).

* * * * *